United States Patent
Moon et al.

(10) Patent No.: US 6,804,456 B1
(45) Date of Patent: *Oct. 12, 2004

(54) RECORDING MEDIUM FOR STORING INFORMATION FOR STILL PICTURE, RECORDING AND/OR REPRODUCING METHOD AND APPARATUS THEREFOR

(75) Inventors: Seong-jin Moon, Suwon (KR); Young-nam Oh, Sungnam (KR); Tae-yun Chung, Gwacheon (KR); Jung-suk Kang, Seoul (KR); Pan-gie Park, Suwon (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,191

(22) Filed: Jun. 24, 1999

(30) Foreign Application Priority Data

| Jun. 24, 1998 | (KR) | ............................................ 98-23992 |
| Oct. 2, 1998 | (KR) | ............................................ 98-41757 |

(51) Int. Cl.⁷ ............................ H04N 7/04; H04N 7/06; H04N 7/08; H04N 7/52; H04N 5/781; H04N 5/85; H04N 5/90; H04N 5/91
(52) U.S. Cl. ........................................... 386/96; 386/125
(58) Field of Search ................................ 386/39, 96–98, 386/105–106, 107, 45, 95, 125, 126; 348/232

(56) References Cited

U.S. PATENT DOCUMENTS

| 5,555,098 A | | 9/1996 | Parulski ...................... 386/104 |
| 5,675,695 A | * | 10/1997 | Hirayama et al. ............. 386/95 |
| 5,675,737 A | | 10/1997 | Horie et al. .................. 709/212 |
| 5,687,160 A | | 11/1997 | Aotake et al. ............ 369/275.3 |
| 5,691,972 A | * | 11/1997 | Tsuga et al. .............. 369/275.3 |
| 5,734,787 A | | 3/1998 | Yonemitsu et al. .......... 386/111 |
| 5,734,788 A | | 3/1998 | Nonomura et al. .......... 386/126 |
| 5,771,334 A | | 6/1998 | Yamauchi et al. ............. 386/95 |
| 5,863,206 A | * | 1/1999 | Narusawa et al. ....... 434/307 A |
| 5,915,066 A | * | 6/1999 | Katayama ..................... 386/70 |
| 5,974,015 A | | 10/1999 | Iizuka et al. .................. 369/60 |
| 6,005,679 A | | 12/1999 | Haneda ....................... 358/453 |
| 6,023,552 A | * | 2/2000 | Kunihiro ...................... 386/98 |

(List continued on next page.)

FOREIGN PATENT DOCUMENTS

| EP | 0 295 148 | 12/1988 |
| EP | 0 689 206 | 12/1995 |
| EP | 0 730 272 | 9/1996 |
| EP | 0 788 101 A1 | 8/1997 |
| JP | 63-308705 | 12/1988 |
| JP | 8-298645 | 11/1996 |
| JP | 9-259536 | 10/1997 |

OTHER PUBLICATIONS

U.S. patent application Ser. No. 09/597,799, Moon et al., filed Jun. 20, 2000.
U.S. patent application Ser. No. 09/595,901, Moon et al., filed Jun. 20, 2000.
Patent Abstracts of Japan; Publication No. 09259536, published Mar. 10, 1997.

*Primary Examiner*—Thai Tran
*Assistant Examiner*—Polin Chieu
(74) *Attorney, Agent, or Firm*—Staas & Halsey LLP

(57) ABSTRACT

A recordable and/or rewriteable recording medium for storing still picture data, and recording and/or reproducing method and apparatus therefor. The recording medium stores still picture group information for grouping a plurality of still pictures in order to manage the still picture at a group level, and stores audio group information for grouping additional audio data added to the still picture data after the still picture data are recorded. Therefore, large-capacity still picture data and additional audio data added thereto can be recorded using a minimum amount of management information. Further, during reproduction, data can be displayed and edited in units of the respective still pictures. Also, it is possible to cope with after-recording of the audio data.

49 Claims, 19 Drawing Sheets

| | Contents | Number of Bytes |
|---|---|---|
| MAP_TY | Map type | 1 bit |
| VOB_ID | VOB ID | 7 bits |
| V_PART_SZ | Size of Video part | 1 byte |
| GAOB_ID | GAOB ID for after_recorded audio | 12 bits |
| AOB_ID | AOB ID for after_recorded audio | 1 byte |

| | Contents | Number of Bytes |
|---|---|---|
| MAP_TY | Map type | 1 bit |
| | Reserved | 7 bits |
| A_PBTM | Playback Time of Audio | 2 bytes |
| A_PART SZ | Size of Audio part | 2 bytes |

U.S. PATENT DOCUMENTS

| | | | |
|---|---|---|---|
| 6,032,096 A | * 2/2000 | Takahashi | 701/55 |
| 6,047,292 A | * 4/2000 | Kelly et al. | 707/104 |
| 6,067,400 A | 5/2000 | Saeki et al. | 386/95 |
| 6,088,507 A | 7/2000 | Yamauchi et al. | 386/95 |
| 6,125,232 A | * 9/2000 | Taira et al. | 386/95 |
| 6,141,385 A | * 10/2000 | Yamaji | 375/240.27 |
| 6,157,769 A | * 12/2000 | Yoshimura et al. | 386/68 |
| 6,167,192 A | * 12/2000 | Heo | 386/105 |
| 6,212,330 B1 | * 4/2001 | Yamamoto et al. | 386/95 |
| 6,249,641 B1 | * 6/2001 | Yokota | 386/94 |
| 6,283,764 B2 | * 9/2001 | Kajiyama et al. | 434/307 A |
| 6,334,025 B1 | 12/2001 | Yamagami | 386/96 |
| 6,381,403 B1 | * 4/2002 | Tanaka et al. | 386/106 |
| 6,385,389 B1 | * 5/2002 | Maruyama et al. | 386/95 |

* cited by examiner

| | Contents | Number of Bytes |
|---|---|---|
| | Reserved | 2 bytes |
| GVOB_ID | VOB Group ID | 2 bytes |
| GVOB_S_ADR | Start address of VOB Group | 4 bytes |
| GVOB_Ns | Number of Video Parts | 1 byte |

|  | Contents | Number of Bytes |
|---|---|---|
| MAP_TY | Map type | 1 bit |
| VOB_ID | VOB ID | 7 bits |
| V_PART_SZ | Size of Video part | 1 byte |
| GAOB_ID | GAOB ID for after_recorded audio | 12 bits |
| AOB_ID | AOB ID for after_recorded audio | 1 byte |

|  | Contents | Number of Bytes |
|---|---|---|
| MAP_TY | Map type | 1 bit |
|  | Reserved | 7 bits |
| A_PBTM | Playback Time of Audio | 2 bytes |
| A_PART_SZ | Size of Audio part | 2 bytes |

|  | Contents | Number of Bytes |
|---|---|---|
|  | Reserved | 2 bytes |
| GAOB_ID | AOB Group ID | 2 bytes |
| GAOB_S_ADR | Start address of AOB Group | 4 bytes |
| GAOB_Ns | Number of Audio Parts | 1 byte |

| | Contents | Number of Bytes |
|---|---|---|
| AOB_ID | AOB ID | 7 byte |
| A_PBTM | Playback Time of Audio | 2 bytes |
| A_PART_SZ | Size of Audio Part | 2 bytes |

FIG. 18

|  | Contents | Number of Bytes |
|---|---|---|
| S_GVOB_ID | VOB Group ID for Still Picture | 2 bytes |
| S_VOB_ID | VOB ID for Start Still Picture | 1 byte |
| E_VOB_ID | VOB ID for END Still Picture | 1 byte |
|  | Reserved | 5 bytes |

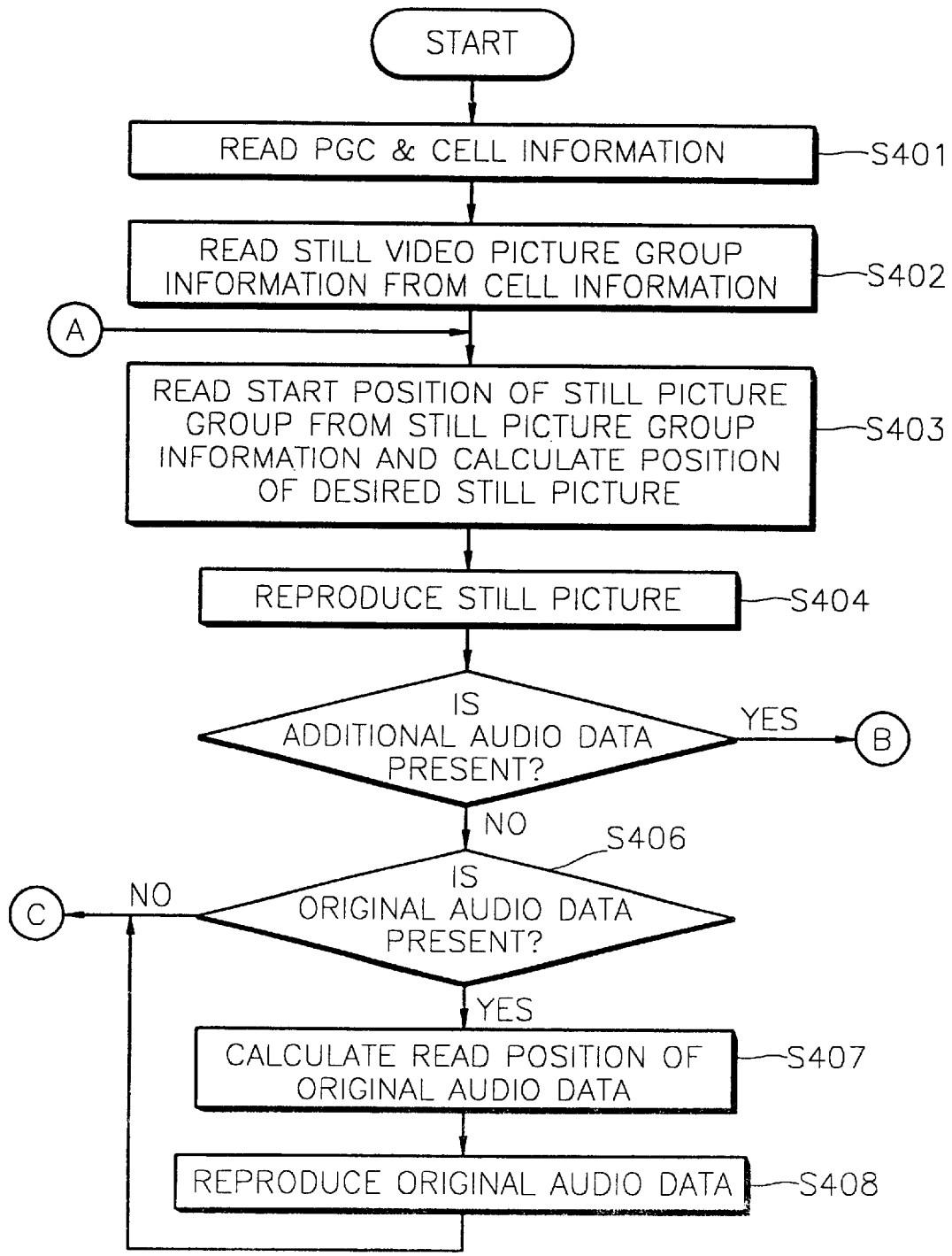

US 6,804,456 B1

RECORDING MEDIUM FOR STORING INFORMATION FOR STILL PICTURE, RECORDING AND/OR REPRODUCING METHOD AND APPARATUS THEREFOR

CROSS-REFERENCE TO RELATED APPLICATIONS

This application claims the benefit of Korean Application Nos. 98-23992, filed Jun. 24, 1998 and 98-41757, filed Oct. 2, 1998, in the Korean Patent Office, the disclosures of which are incorporated herein by reference.

BACKGROUND OF THE INVENTION

1. Field of the Invention

The present invention relates to recording and/or reproducing audio and/or video data using a rewriteable recording medium, and more particularly, to a recording medium for storing still pictures and additional audio data added thereto for effective processing, and a recording and/or reproducing method and apparatus therefor.

2. Description of the Related Art

FIG. 1 shows a connection structure for various kinds of information in a moving picture and moving picture data, in recording/reproducing audio and/or video data on a recordable and/or rewriteable recording medium, specifically, a digital versatile disk (DVD), and more precisely, it illustrates the relationship between program chain (PGC) information 11 for treating data logically, moving picture information 12 consisting of video object (VOB) information, and a moving picture data file 13 in which actually compressed audio/video (A/V) data are recorded in VOB units.

First, terms used throughout the specification will now be described. Supposing a movie was recorded in first and second parts, the overall movie is a program chain (PGC) and the first and second parts are programs. Also, each program can be defined by further dividing the same into several cells called sub-units. The information in each cell can wholly or partially define a video object (VOB). In such an event, each cell is used as a basic accessing unit during reproduction, and the program and PGC are only the information for connectivity between a plurality of cells.

Also, since data is actually sub-divided into videos object units (VOBUs) and recorded in a moving picture data file, the VOB information consists of various kinds of information relating to the VOBU data, that is, VOBU #1, VOBU #2, . . . and the VOB data in the moving picture data file 13 is accessed by the VOB information. Here, the VOB data is used as a random access unit of a disk recording/reproducing apparatus. The VOBU is based on a single GOP (Group of Pictures) in the case of an MPEG (Moving Picture Experts Group) video, and audio data corresponding to video data is collected, that is, A/V data is multiplexed into sectors, to constitute a VOBU.

The data format shown in FIG. 1 is concerned with the moving picture, in which the unit of actual data, the VOB, comprises moving picture data for a fixed period of time. Synchronization or encoding of A/V signals is performed in units of VOBs. However, in the case of a still picture, each VOB constitutes a still picture. When a VOB is designated in a cell structure, a cell is necessary for each still picture. Thus, as more still pictures are recorded, more information is added.

Generally, data errors may be generated if data is recorded on a recordable disk a predetermined number of times. Thus, there is a limit in the number of times of rewriting data on a disk. All information is stored in the memory of a controller for controlling the system for the purpose of limiting the number of recording times and rapidly accessing data. However, as described above, in the case of a still picture, if the amount of information is increased, much time is required for reading the information. Also, there is a limit to the amount of information that can be stored in a memory with a limited size. Accordingly, it is not possible to record a large-capacity still picture.

SUMMARY OF THE INVENTION

To solve the above problems, it is a first object of the present invention to provide a recording medium for effectively storing information for a large-capacity still picture by grouping the large-capacity still pictures and storing the information for the still picture groups.

It is a second object of the present invention to provide a recording medium for arranging still picture group information consisting of video information for a still picture and video and audio information for a still picture having original audio data added thereto in the recording order of recorded bitstreams and storing the same.

It is a third object of the present invention to provide a recording medium for recording additional audio data added to a still picture data and storing additional audio group information for grouping the recorded additional audio data to manage the same.

It is a fourth object of the present invention to provide a method of recording still picture group information for grouping large-capacity still pictures to manage the same, and reproduction-related cell information, and reproducing a still picture in accordance with the recorded information.

It is fifth object of the present invention to provide a method of recording still picture group information consisting of video information for a still picture and video and audio information for a still picture having original audio data added thereto, and reproduction-related cell information, and reproducing a still picture or a still picture having original audio data added thereto.

It is sixth object of the present invention to provide a method of recording still picture group information, additional audio group information for after-recording and reproduction-related cell information, and reproducing a still picture, a still picture having original audio data added thereto, or a still picture having additional audio data added thereto in accordance with the recorded information.

It is seventh object of the present invention to provide an apparatus for recording still picture group information for grouping large-capacity still pictures and managing the same, additional audio group information for after-recording separately from the still picture group information, and reproduction-related cell information, and reproducing a still picture, a still picture having original audio data added thereto, or a still picture having additional audio data added thereto in accordance with the recorded information.

Additional objects and advantages of the invention will be set forth in part in the description which follows and, in part, will be obvious from the description, or may be learned by practice of the invention.

To achieve these objects, there is provided a recording medium including a first region having a plurality of still picture data, a second region having a plurality of additional audio data added to the still picture data, and a third region having information indicating the connectivity between the still picture data in the first region and the additional audio data in the second region.

According to the present invention, there is provided a method of recording and/or reproducing audio and/or video data on a recordable and/or rewriteable recording medium including (a) recording a plurality of still pictures, (b) separating the plurality of still pictures into within a predetermined maximum number of groups and recording still picture group information and playback information related to reproduction, (c) recording additional audio data added to a desired still picture in a separate area, after the plurality of still pictures are recorded, and (d) recording additional audio group information for separating the additional audio data into within a predetermined maximum number of groups in order to manage the additional audio data at a group level, and information indicative of the additional audio data corresponding to the desired still picture, wherein the information indicative of the additional audio data is included in the still picture group information.

The method according to the present invention may further include (e) reading the still picture group information to be reproduced in accordance with the playback information, (f) calculating the position of a desired still picture in accordance with the read still picture group information and reproducing the still picture data located at the calculated position, and (g) if the information indicative of an additional audio group is present in the read still picture group information, calculating the position of the additional audio data for the corresponding still picture in accordance with the additional audio group information and reproducing the corresponding additional audio data.

In a reproduction method of a recording medium comprising a first region having data for a plurality of still pictures, a second region having data for a plurality of additional audio data added to the still pictures, and a third region having information indicating the connectivity between the still picture data in the first region and the additional audio data in the second region, the reproduction method includes reproducing the still picture data in the first region and the additional audio data added to the still picture data, based on the connectivity information in the third region.

The apparatus according to the present invention includes a recording processor for signal-processing a plurality of still picture data to be recorded in a first region of the recording medium and signal-processing a plurality of additional audio data added to the still picture data to be recorded in a second region of the recording medium, and a controller to generate connectivity information indicative of the connectivity between the still picture data in the first region and the additional audio data in the second region, and playback information related to the reproduction order, and to control the same to be recorded in a third region.

Also, the apparatus may further include a playback processor for signal-processing the still picture data in the first region and the additional audio data added to the still picture data to be reproduced based on the information in the third region.

BRIEF DESCRIPTION OF THE DRAWINGS

The above objects and advantages of the present invention will become more apparent by describing in detail a preferred embodiment thereof with reference to the attached drawings in which:

FIG. 18 is a table showing an example of the detailed contents of cell information for the still picture shown in FIGS. 7 and 8;

FIGS. 22A and 22B are flowcharts showing a method for reproducing a still picture according to a second embodiment of the present invention.

DESCRIPTION OF THE PREFERRED EMBODIMENTS

Figure 1:
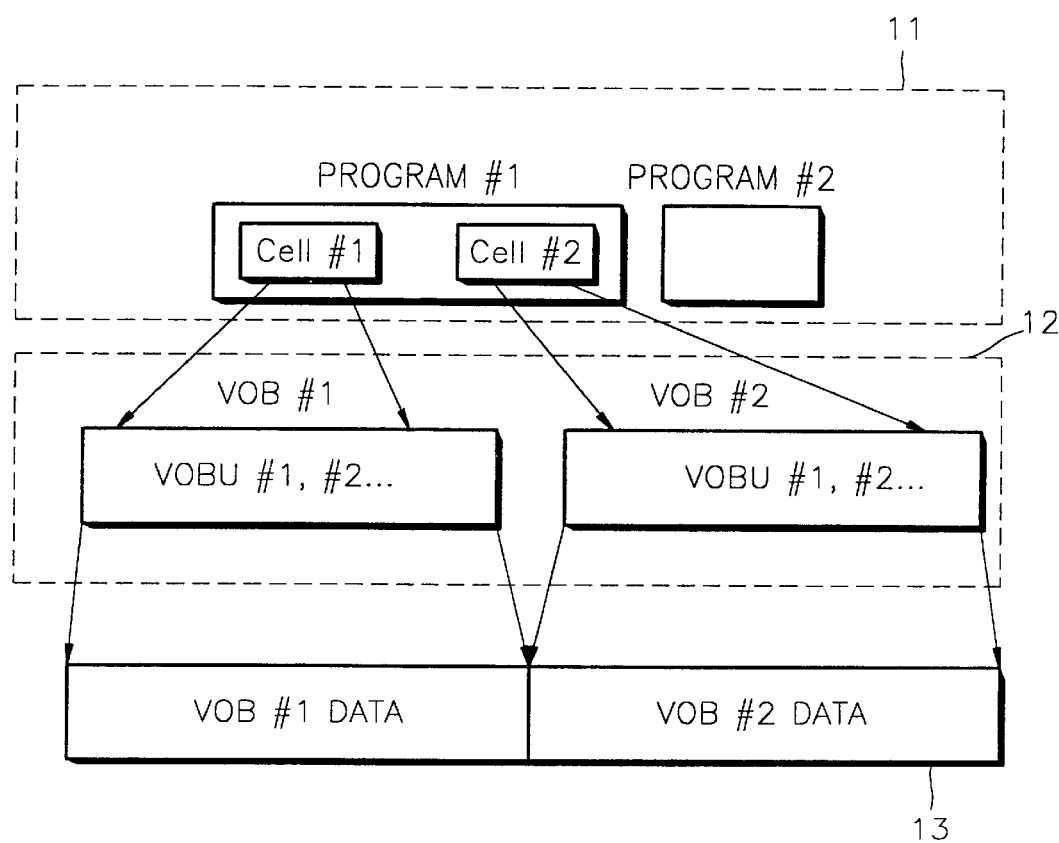
FIG. 1 illustrates a connection structure of various kinds of information and data in a moving picture.

Hereinafter, preferred embodiments of recording media for storing the information for a still picture, and recording and/or reproducing method and apparatus therefor, will be described, examples of which are illustrated in the accompanying drawings, wherein like reference numerals refer to the like elements throughout. The embodiments are described below in order to explain the present invention by referring to the figures.

Figure 2:
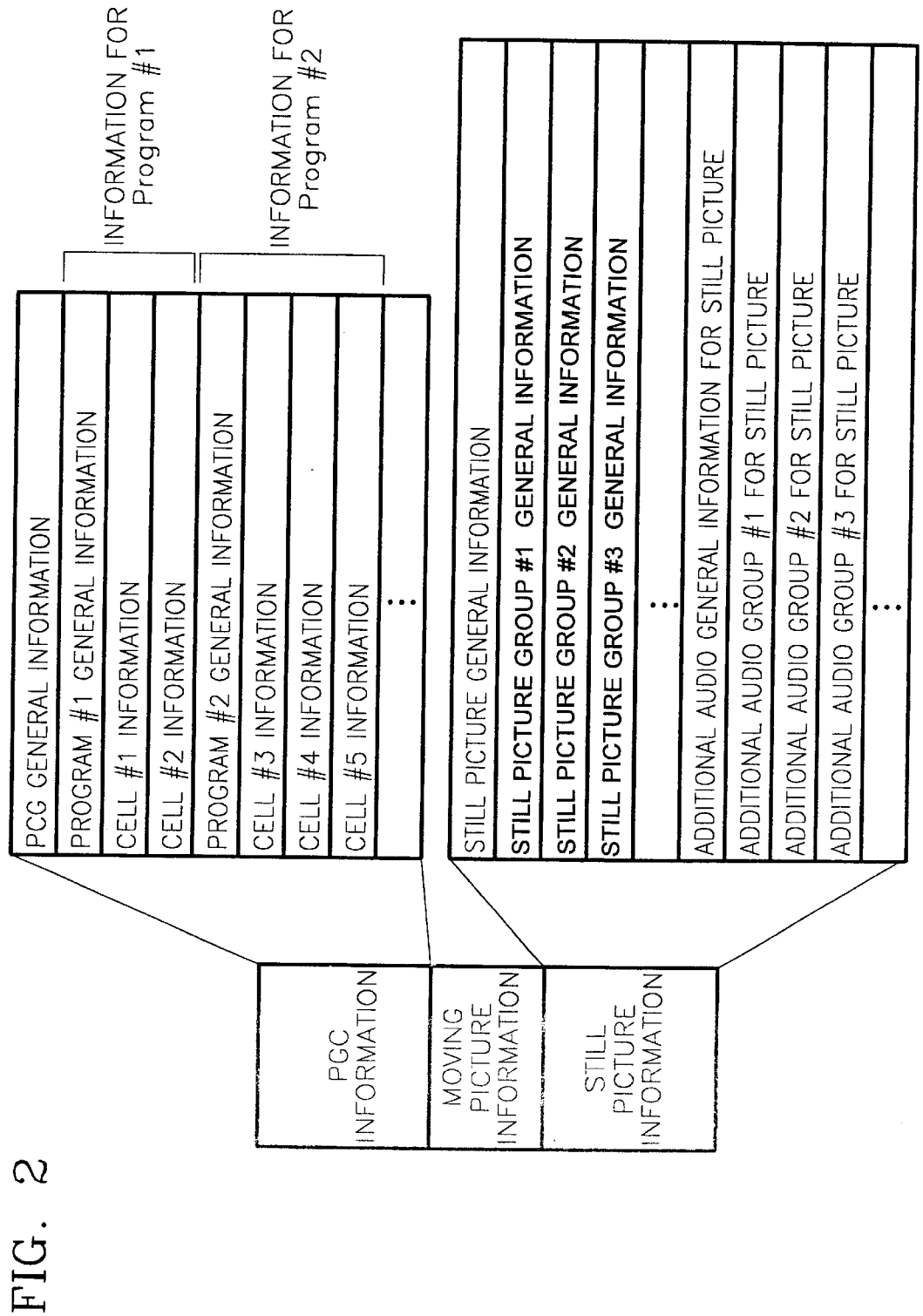
FIG. 2 shows an example of an overall information structure according to the present invention.

FIG. 2 shows an example of an overall information structure according to the present invention, in which information consisting of PGC information, moving picture information and still picture information can be recorded in an information file or an information area.

Figure 3:
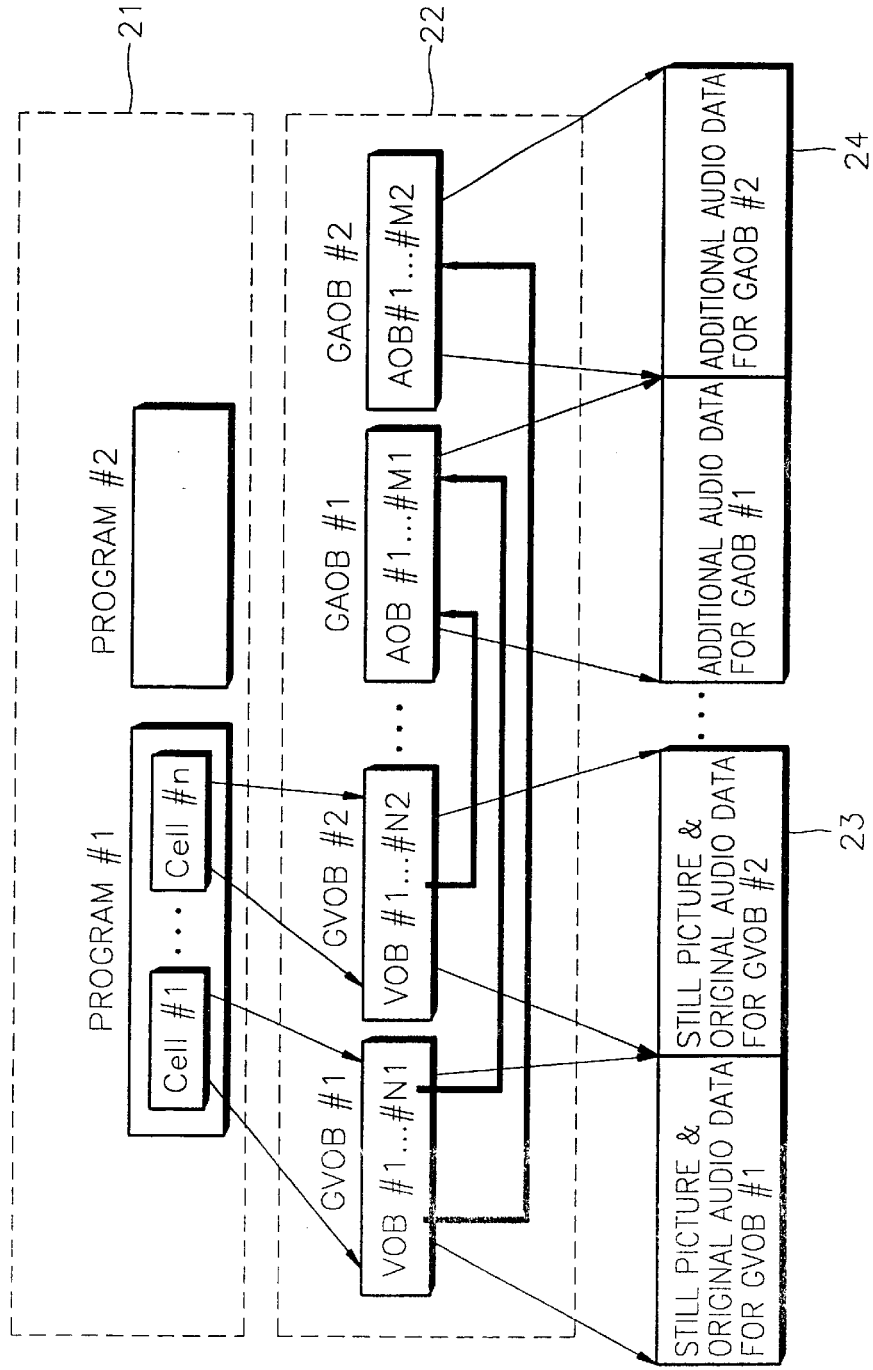
FIG. 3 shows the relationship between various kinds of information and still picture data in a still picture according to the present invention.

Here, PGC general information contains information such as the number of programs in a PGC. Program general information contains information such as the number of cells in a program. The cell information designates a VOB in the case of a moving picture, as shown in FIG. 1, and designates a still picture VOB group (to be abbreviated as "still picture group" for brevity) instead of a VOB, in the case of a still picture, as shown in FIG. 3. Since the moving picture information has already been described with reference to FIG. 1, a description thereof will be omitted herein and still picture information according to the present invention will now be described. Still picture general information contains information relating to a number of kinds of still picture group information, and additional audio general information for the still picture contains information relating to a number of kinds of additional audio group information.

FIG. 3 shows the connection structure of various kinds of information and still picture data in a still picture. In other words, in a still picture recorded in units of VOBs in a data file, a plurality of VOBs for still pictures are managed by a still picture group, and cell information contained in the PGC information 21 designates still picture group information (GVOB), rather than a single VOB information. Also, audio data may be recorded in addition to the still picture. The audio data is recorded consecutively after the still picture is recorded, thereby reducing the search time of a reproducing head during reproduction. The audio data recorded together with the still picture is called original audio data, which is contained in the still picture group. In the present invention, unless specifically defined, a still picture represents both one having only a video part and one having the original audio part and the video part. By managing the still picture by grouping the same in such a manner, the amount of cell information and still picture information can be reduced. For example, video coding attributes or original audio coding attributes in a still picture group are assimilated, thus forming still picture group general information, and stored as common information. For the respective still pictures, the positions thereof in the still picture data file must be indicated. In the case when the still pictures are not separated into a plurality of groups, the start positions of the respective still pictures must be indicated. However, in the case when the still pictures are grouped, the start position at which the pertinent still picture group starts to be recorded in a file is stored in the still picture group general information and then only the sizes of the respective still pictures are recorded as the information for the respective still pictures. Since the amount of information indicative of the size of still picture data, i.e., the number of bytes, is generally less than that indicative of the position in a file, the overall amount of information can be reduced.

A user may add separate additional audio data to a desired still picture after recording the still picture and original audio data on a still picture file 23. At this time, only the additional audio data are collected and recorded in a separate area in the additional audio data file 24 or the still picture file 23, with the original audio data being retained. The additional audio data are also managed by grouping in the same manner as in the still picture data and the concept thereof is the same as that of the still picture data. In other words, a plurality of additional audio data having the same attributes, e.g., audio coding attributes, are grouped into an additional audio group (to be abbreviated as "GAOB") and then additional audio group general information is recorded as common information. For the respective additional audio data AOBs, necessary data for each AOB, for example, the size information, is recorded. The additional audio group general information contains the start positions of audio data in the respective additional audio groups (GAOBs) (start positions of each additional audio group). The connection information for the additional audio data added to the specific still picture, which is indicated by thick arrows in FIG. 3, is present in the still picture group information GVOB #1, GVOB #2, . . . In other words, additional audio group identification information for designating additional audio data existing in the still picture group information and additional audio identification information in the pertinent additional audio group are contained in the still picture group information.

In order to locate a recording position of a specific still picture in the still picture group, the start position of the still picture group data contained in the still picture group general information is added to the size of the data preceding the still picture to be located. Likewise, in order to search the recording position of specific additional audio data, the start position of the additional audio group data contained in the additional audio group general information is added to the size of the data preceding the additional audio data to be located.

In the case of a still picture group, video parts and audio parts are consecutively recorded in a file or space. Thus, the video information and the audio information each containing the size thereof are also recorded in the bitstream order in which the video data and the original audio data are actually recorded. In the case of an additional audio group, there is only the additional audio data. Thus, only the additional audio information is recorded in the bitstream order in which the additional audio data is actually recorded.

Thus, as shown in FIG. 3, there is the still picture file 23 to which the original audio data may be added, the additional audio data file 24 added to the still picture and the information file containing the PGC information 21 and the still picture information 22 having the still picture group information (GVOB) and the additional audio group information (GAOB). However, the additional audio data may be recorded in a separate area of the still picture file 23, rather than in the additional audio data file 24. The still picture file 23 can be designated by a first region, the additional audio data file 24 can be designated by a second region, and the information file containing the PGC information 21 and the still picture information 22 can be designated by a third region which is a logic region.

Figure 4:
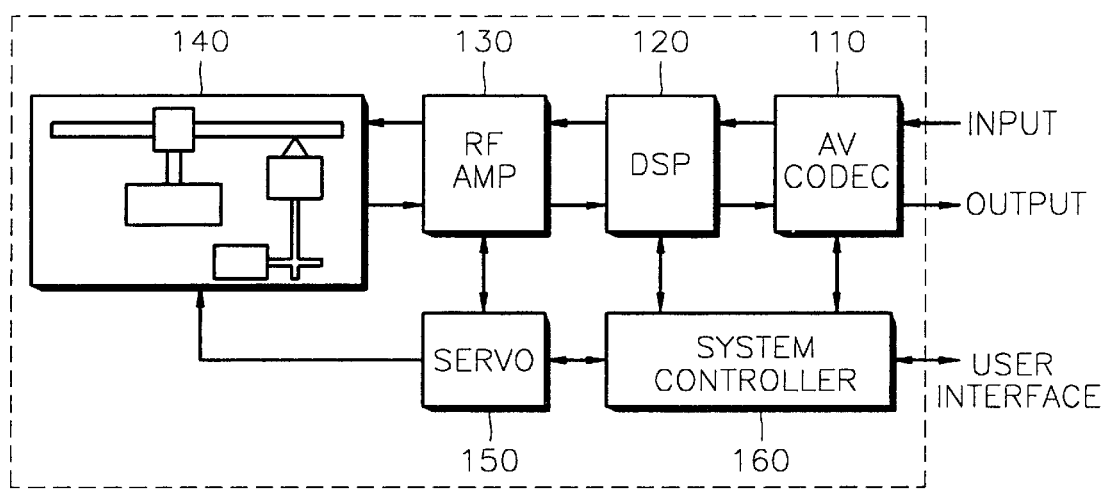
FIG. 4 is a block diagram of a recording/reproducing apparatus according to the present invention.

FIG. 4 is a block diagram of a recording/reproducing apparatus for implementing the present invention. The function of an apparatus for recording/reproducing A/V (audio/video) data using a recordable and rewriteable disk is largely divided into recording and reproduction.

During recording, an AV codec 110 compression-codes an externally applied A/V signal by a predetermined compression scheme and supplies size information for compressed data. A digital signal processor (DSP) 120 receives A/V data supplied from the AV codec 110, adds additional data for ECC (error correction code) processing thereto and performs modulation using a predetermined modulation scheme. A radio frequency amplifier (RF AMP) 130 converts electrical data supplied from the DSP 120 into an RF signal. A pickup 140 drives a disk and records the RF signal supplied from the RF AMP 130, incorporating an actuator for focusing and tracking. A servo 150 receives information necessary for servo control from a system controller 160 and stably performs a servo function. The system controller 160 controls the overall system through interfacing with a user to thus control the still picture to be recorded on the disk and record separate information for the recorded still picture. Still picture data are managed at a group level by constructing the still picture group information of the information for the respective still pictures, including size information of still picture data, size information of original audio data, playback time information of original audio data and the like, and the position information of the respective still pictures, in the recording order of recorded still pictures and audio data. When additional audio data is added to a still picture, the added additional audio data is recorded in a different file from or in the same file as that for the still picture but in a different area from that of the still picture. Additional audio data are managed at a group level by constructing additional audio group information of the information for recorded additional audio data, including size information of additional audio data, playback time information of additional audio data and the like, and position information of the respective additional audio groups. The information for the respective still pictures includes information indicative of the added additional audio data.

Cell information concerning the reproduction order is recorded as well as the above-described information. The cell information contains information indicative of the recorded still picture group so that the recorded still picture and audio data can be reproduced.

During playback, the pickup 140 picks up the optical signal from the disk having data stored therein and the data is extracted from the optical signal. The RF AMP 130 converts the optical signal into an RF signal, and extracts a servo signal for performing a servo function, and modulated data. The DSP 120 demodulates modulated data supplied from the RF AMP 130 corresponding to the modulation scheme used during modulation, performs an ECC process to correct errors and eliminates added data. The servo unit 150 receives information necessary for servo control from the RF AMP 130 and the system controller 160 and stably performs a servo function. The AV codec 110 decodes the compressed A/V data supplied from the DSP 120 to output an A/V signal. The system controller 160 controls the overall system for reproducing the user's desired data (still picture only, still picture+original audio data or still picture+additional audio data) using the cell information and still picture group information stored on the disk while performing user interfacing such as processing of the user's key inputs.

In other words, in order to reproduce a specific still picture and audio data, the still picture group information having the still picture to be reproduced is obtained from the cell information, and information such as the size of the still picture data and the information for the data size and playback time of original audio data, if any, is obtained from the still picture group information, thereby reproducing only desired data. Also, if additional audio data is added to the still picture, desired additional audio data is reproduced using information for the data size or playback time of the additional audio data from the additional audio group information pointed to by the still picture group information.

Also, if virtually deleted still picture information is read from the still picture group information, the corresponding still picture and original audio data are not reproduced so that although the data actually exists, it seems to the user that it does not exist. Likewise, if the added additional audio data is virtually deleted, it is not reproduced.

Here, the A/V codec 110, the DSP 120, the RF AMP 130 and the pickup 140 operating during recording can be referred to as a recording processor. Also, the pickup 140, the RF AMP 130, the DSP 120 and the A/V codec 110 operating during playback can be referred to a reproduction processor.

Figure 5:
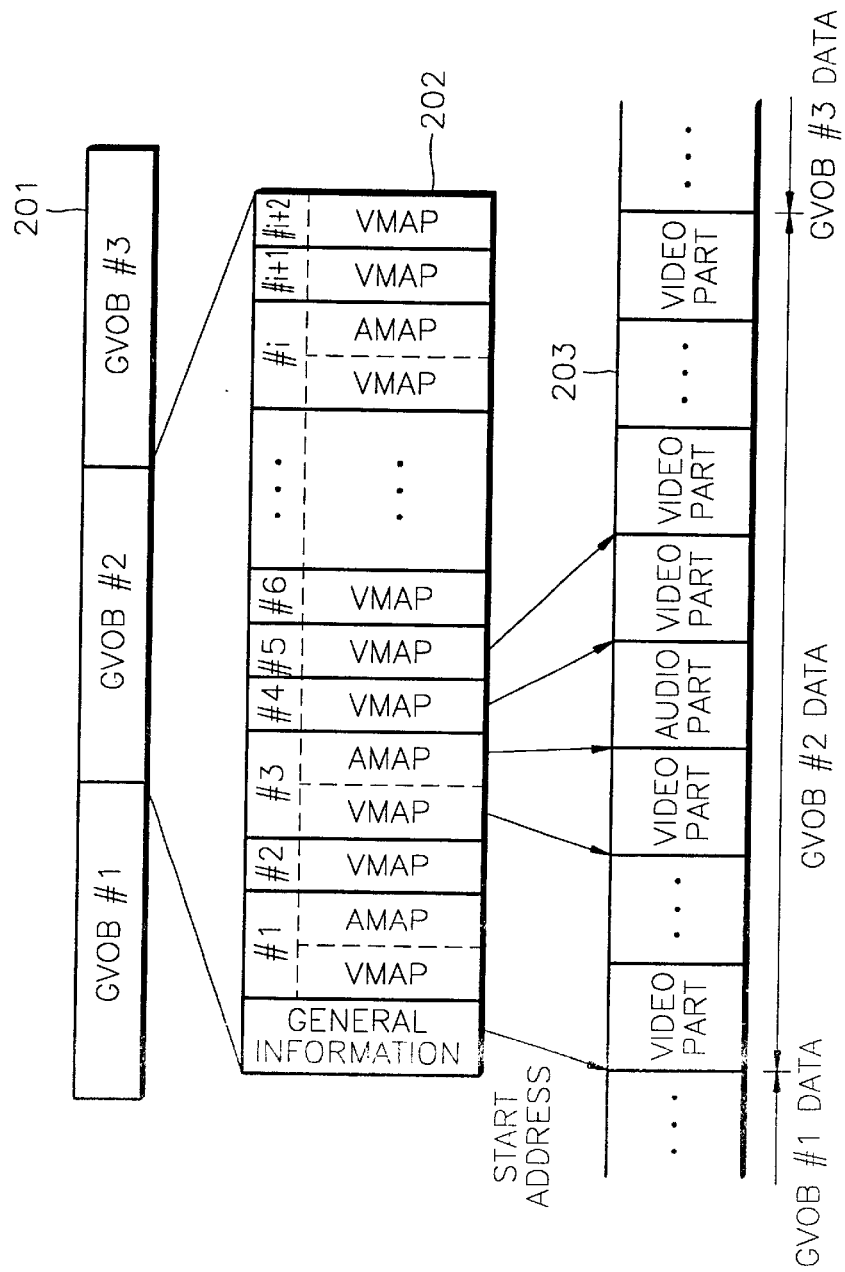
FIG. 5 shows the relationship between still picture data and still picture group information according to the present invention.

FIG. 5 shows the relationship between still picture data and still picture group information, in which the information for a plurality of still pictures (e.g., 64 maximally) having the same attributes is recorded in the respective still picture group (GVOB) information 201. The number of the still pictures forming each still picture group is determined such that it is within the limit of the maximum number of still pictures. Each still picture group information 202 includes still picture group general information and information for the respective still pictures and is information for still picture data 203 including video parts and video or audio parts in a sequence of bitstreams recorded. The still picture group generation information has the start address of the corresponding still picture group.

Also, as information for the respective still pictures, still picture information having original audio data exists in the form of map information including video part information for video parts and audio part information for audio parts. Here, a video map and an audio map for a still picture have the same identification information. If the still picture information is composed of only a video part, it exists in the form of a map having only the video part information. Here, still picture data is recorded in a VOB.

Figure 6:
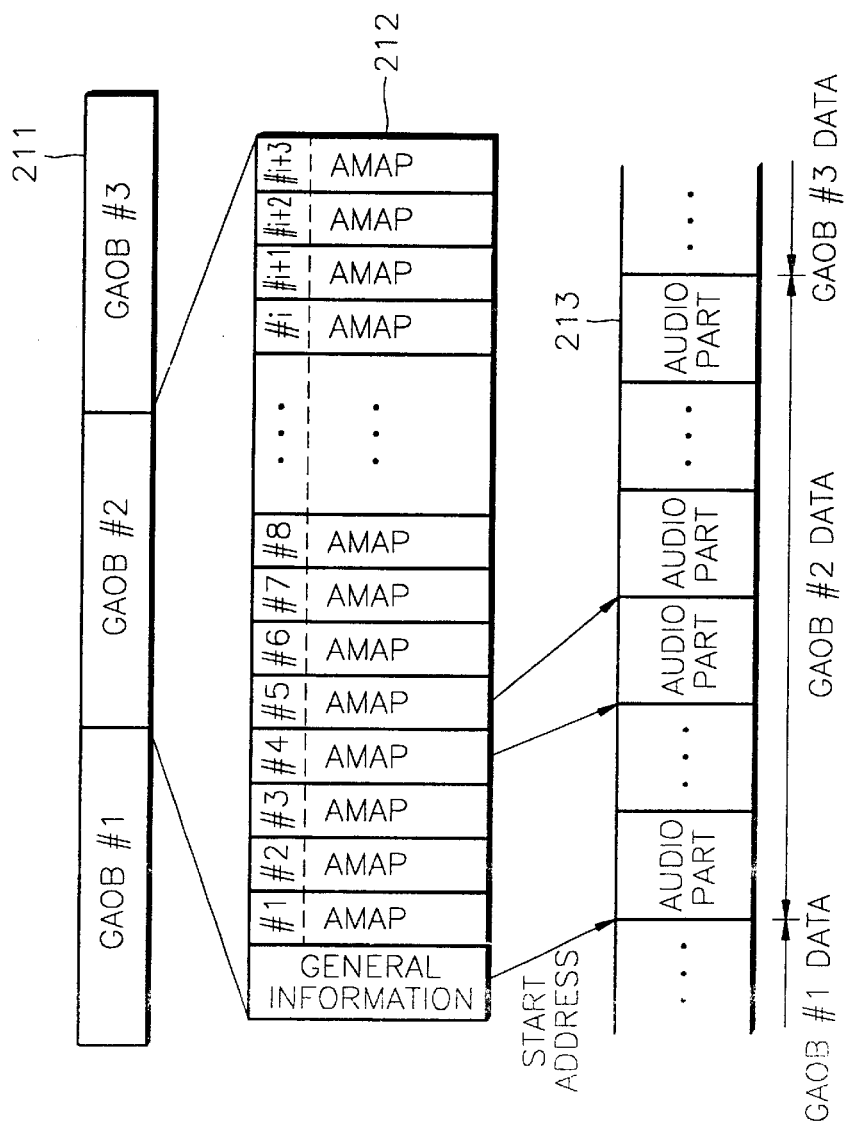
FIG. 6 shows the relationship between additional audio data added to still picture data and additional audio group information according to the present invention.

FIG. 6 shows the relationship between additional audio data added to a still picture and additional audio group information according to the present information, in which additional audio group (GAOB) information 211 includes information for additional audio data recorded in units of a plurality of still picture groups. Additional audio group information 212 has additional audio group general information containing the start address of the corresponding additional audio group and audio maps (AMAPs) following the sequence of additional audio data. The information for additional audio data 213 including an additional audio part of a still picture is recorded in each additional audio map, inclusive of size information of the additional audio data.

Figure 7:
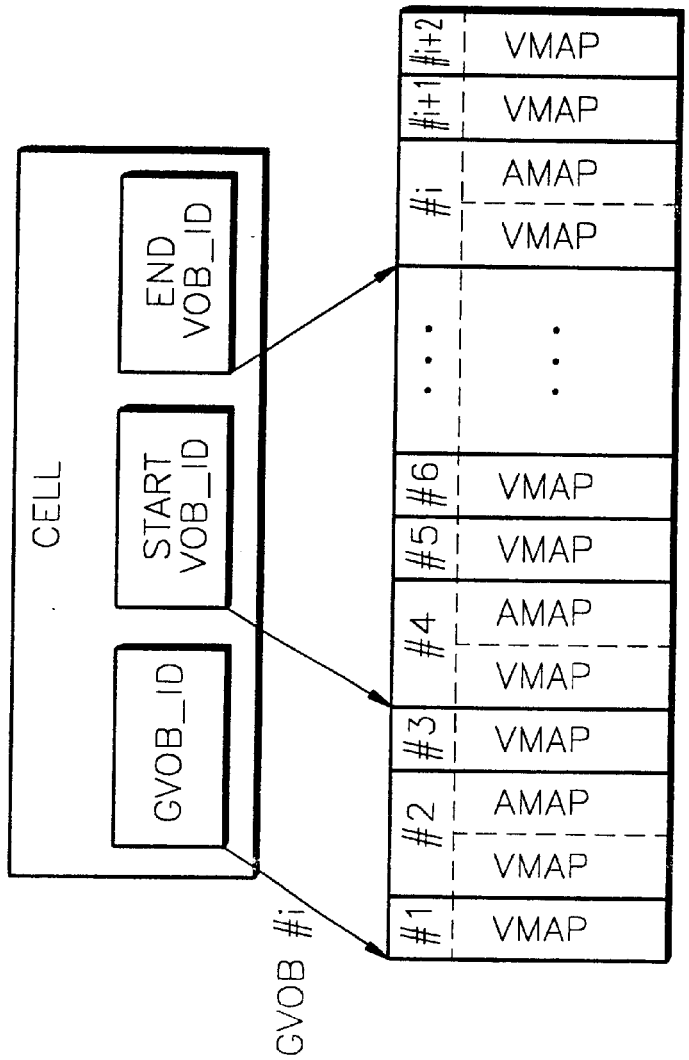
FIG. 7 shows the relationship between cell information and still picture group information.

FIG. 7 shows the relationship between cell information (which can also be referred to as playback information ) and still picture group information, in which a cell is a logical unit in relation to indication of a reproduction order. The cell information includes still picture group identification information (GVOB_ID), still picture reproduction start identification information (START VOB_ID) of the corresponding still picture group and still picture reproduction ending identification information (END VOB_ID). The cell information may correspond to all the still picture groups or may correspond to only some of the still picture groups which are intended to be reproduced.

The additional audio data is stored in a separate area from the still picture data, that is, in a different file or in a different area of the same file from or as that of the still picture data.

For example, in the case when the additional audio data is stored in a separate file from the still picture data, as shown in FIG. 7, GVOB #1, #2 and #3 having still picture data constitute a file. Also, as shown in FIG. 8, GAOB #1, #2 and #3 having additional audio data constitute a file.

Thus, in the case of recording/reproducing actual still picture or additional audio data, the still picture or additional audio data is accessed using the information of each file.

Alternatively, in the case when the additional audio data and the still picture data are stored in one and the same file, GVOB #1, #2 and #3 and GAOB #1, #2 and #3 shown in FIGS. 5 and 6 constitute a file. In constituting the file in such a manner, the respective GVOBs and GAOBs may be mixed in the recording order, for example, in the order of GVOB #1, GVOB #2, GAOB #1, GVOB #3, GAOB #2 and GAOB #3. In this particular case, it is easy to allocate the space for recording. That is, simple sequential allocation in recording order regardless of the group type is possible. Otherwise, the GVOBs and GAOBs are coupled and arranged in each batch to constitute a file.

Figure 8:
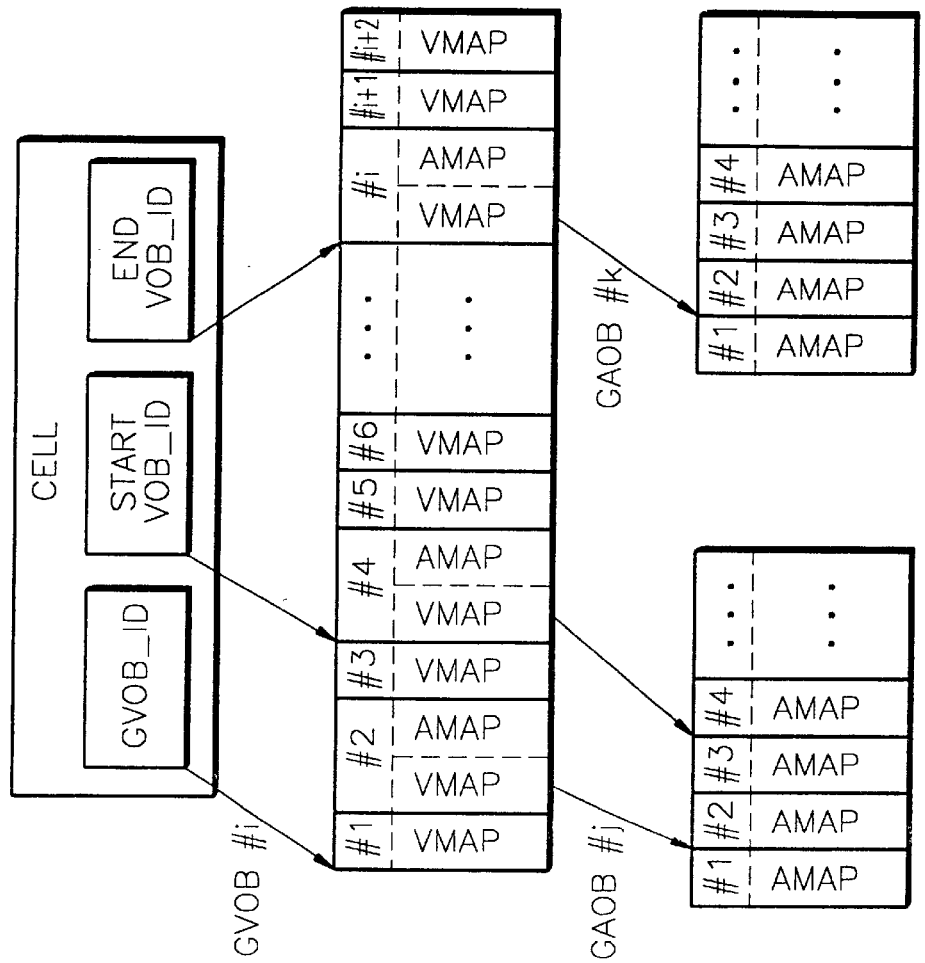
FIG. 8 shows the relationship among cell information, still picture group information and additional audio group information.

FIG. 8 shows the relationship among cell information, still picture group information and additional audio group information, for designating desired additional audio data in the additional audio group recorded in a separate area as well as original audio data as the audio data added to a still picture. The cell information includes still picture group identification information (GVOB_ID), still picture reproduction start identification information (START VOB_ID) in the corresponding still picture group and still picture reproduction ending identification information (END VOB_ID). Video part information in the information for still picture group GVOB #1 may have information for designating additional audio data added to a still picture, that is, additional audio group identification information and additional audio identification information in the corresponding additional audio group. For example, additional audio group identification information GAOB #j and identification information #2 indicating that the additional audio data is the second audio map in the GAOB #j exist in the video part information for a still picture #2 of the still picture group GVOB #i.

Figures 9, 10:
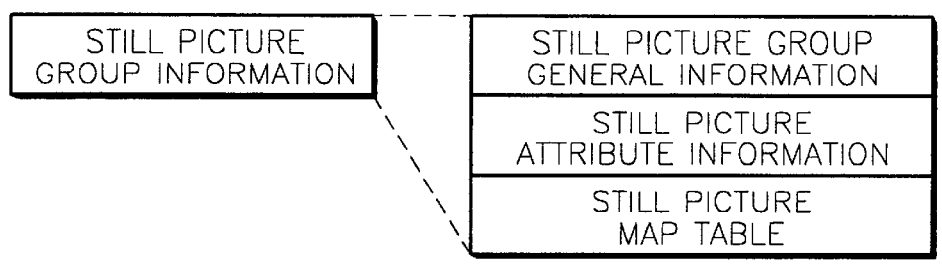
FIG. 9 illustrates the structure of still picture group information according to the present invention.
FIG. 10 is a table showing an example of the detailed contents of general information for a still picture group shown in FIG. 9.

FIG. 9 illustrates the structure of still picture group information according to the present invention, which includes still picture group general information and a still picture map table, and may further include attribute information for a still picture such as picture sizes or video encoding modes.

FIG. 10 is a table showing an example of the detailed contents of still picture group general information shown in FIG. 9, which includes GVOB_ID representing information for identifying a still picture group in a still picture file, GVOB_S_ADR_representing the start address of first still picture data in the corresponding still picture group in the still picture file, GVOB_Ns representing the number of still pictures in the still picture group. Also, the identification information GVOB_ID can be expressly recorded as a unique one for each still picture group in a still picture file or can be suggestively indicated in the order of still picture groups, that is, #1, #2, . . . .

Figures 11, 12, 13:
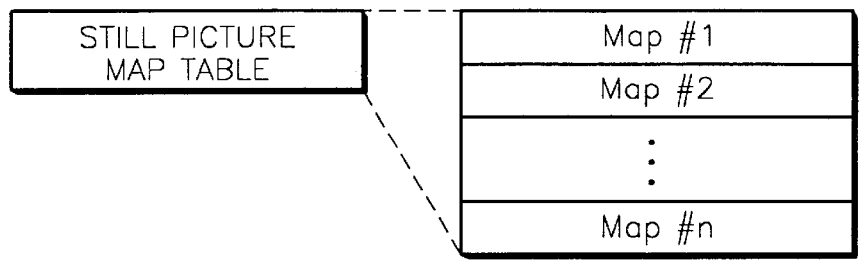
FIG. 11 illustrates the structure of a map table for a still picture shown in FIG. 9.
FIG. 12 is a table showing an example of the detailed contents of a video map in the map table shown in FIG. 11.
FIG. 13 is a table showing an example of the detailed contents of an original audio map connected to the video map shown in FIG. 12.

FIG. 11 illustrates the structure of the still picture map table shown in FIG. 9. There are two types of maps; one is video maps VMAPs for video parts and the other is audio maps AMAPs for original audio parts added to the still pictures. The order of maps is the same as that of data of recorded bitstreams in a still picture file as shown in FIG. 5. Thus, in the case when a still picture has only a video part, there is only a video map. In the case when a still picture has original audio data in addition to the video part, both a video map and an audio map are recorded and are practically considered as one map using the same identification information.

FIG. 12 is a table showing an example of the detailed contents of a video map in the map table shown in FIG. 11, containing MAP_TY indicating the type of a corresponding map and represented by a binary "0" in the case of a video map for a video part, VOB_ID indicating identification information for the video part and ranging from 1 to 64 in the preferred embodiments. Also, VOB_ID can be expressly indicated or suggestively indicated in the recording order, that is, #1, #2, #3, . . . .

Also, the video map contains V_PART_SZ indicating the size of a video part, GAOB_ID which is identification information of an additional audio group, the value of which exists if a still picture has additional audio data, and the value of which is "0" if a still picture does not have additional audio data, and AOB_ID which is identification information of additional audio data in an additional audio group if a still picture has additional audio data, and the value of which is "0" if a still picture does not have additional audio data.

Here, VOB_ID and V_PART_SZ can be referred to as still picture position information, and GAOB_ID and AOB_ID can be referred to as additional audio connectivity information.

FIG. 13 is a table showing an example of the detailed contents of an original audio map, containing MAP_TY indicating the type of a corresponding map and represented by a binary value "1" in the case of an audio map for an audio part, A_PBTM indicating the playback time of an audio part and A_PART_SZ indicating the size of an audio part.

Figures 14, 15:
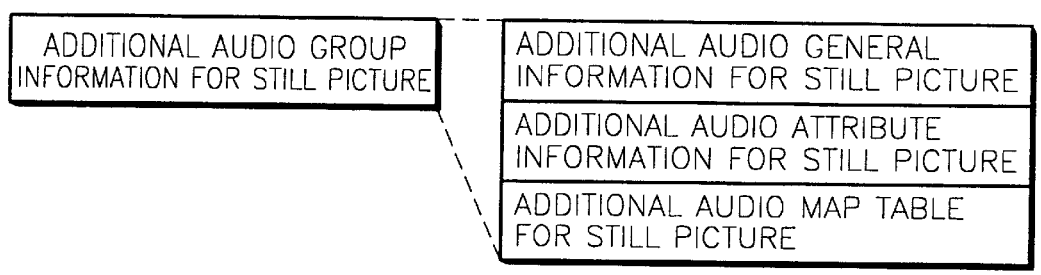
FIG. 14 illustrates the structure of still picture and additional audio group information according to the present invention.
FIG. 15 is a table showing an example of the detailed contents of general information for still picture and additional audio data shown in FIG. 14.

FIG. 14 illustrates the structure of additional audio group information for a still picture according to the present invention, containing additional audio general information and an additional audio map table for the still picture. Also, additional audio attribute information for the still picture may be further included.

FIG. 15 is a table showing an example of the detailed contents of additional audio general information for a still picture, shown in FIG. 14, containing GAOB_ID indicating identification information for an additional audio group in an additional audio file, GAOB_S_ADR indicating the start address of the first additional audio data in the corresponding additional audio group in the additional audio file, and GAOB_Ns indicating the number of additional audio parts contained in the additional audio groups. GAOB_ID can be expressly indicated or suggestively indicated in the recording order.

Figures 16, 17:
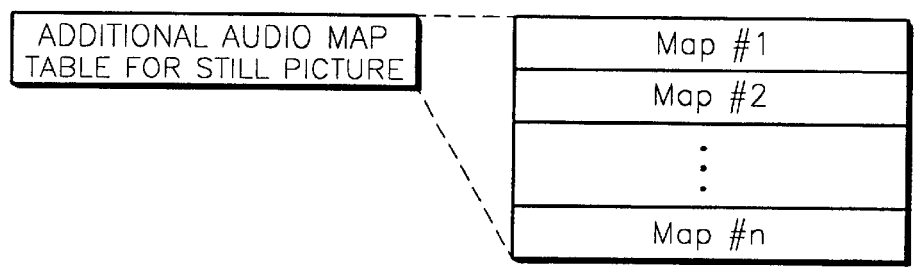
FIG. 16 illustrates the structure of a map table for still picture and additional audio data shown in FIG. 14.
FIG. 17 is a table showing an example of the detailed contents of the map table for still picture and additional audio data shown in FIG. 16.

FIG. 16 illustrates the structure of an additional audio map table consisting of n additional audio maps for additional audio parts shown in FIG. 15.

FIG. 17 is a table showing an example of the detailed contents of the additional audio map table for the still picture shown in FIG. 16, containing AOB_ID indicating identification information for a specific audio part in an additional audio group and ranging from 1 to 64 in the preferred embodiments, A_PBTM indicating the playback time of additional audio data and A_PART_SZ indicating the size of additional audio data such as the number of sectors. Here, AOB_ID can be expressly indicated or suggestively indicated in the recording order, that is, #1, #2, #3, . . . .

FIG. 18 is a table showing an example of the detailed contents of cell information for a still picture, shown in FIGS. 7 and 8, containing S_GVOB_ID indicating identification information for a still picture group, S_VOB_ID indicating identification information for a still picture in which reproduction starts, and E_VOB_ID indicating identification information for a still picture in which reproduction ends.

Figure 19A:
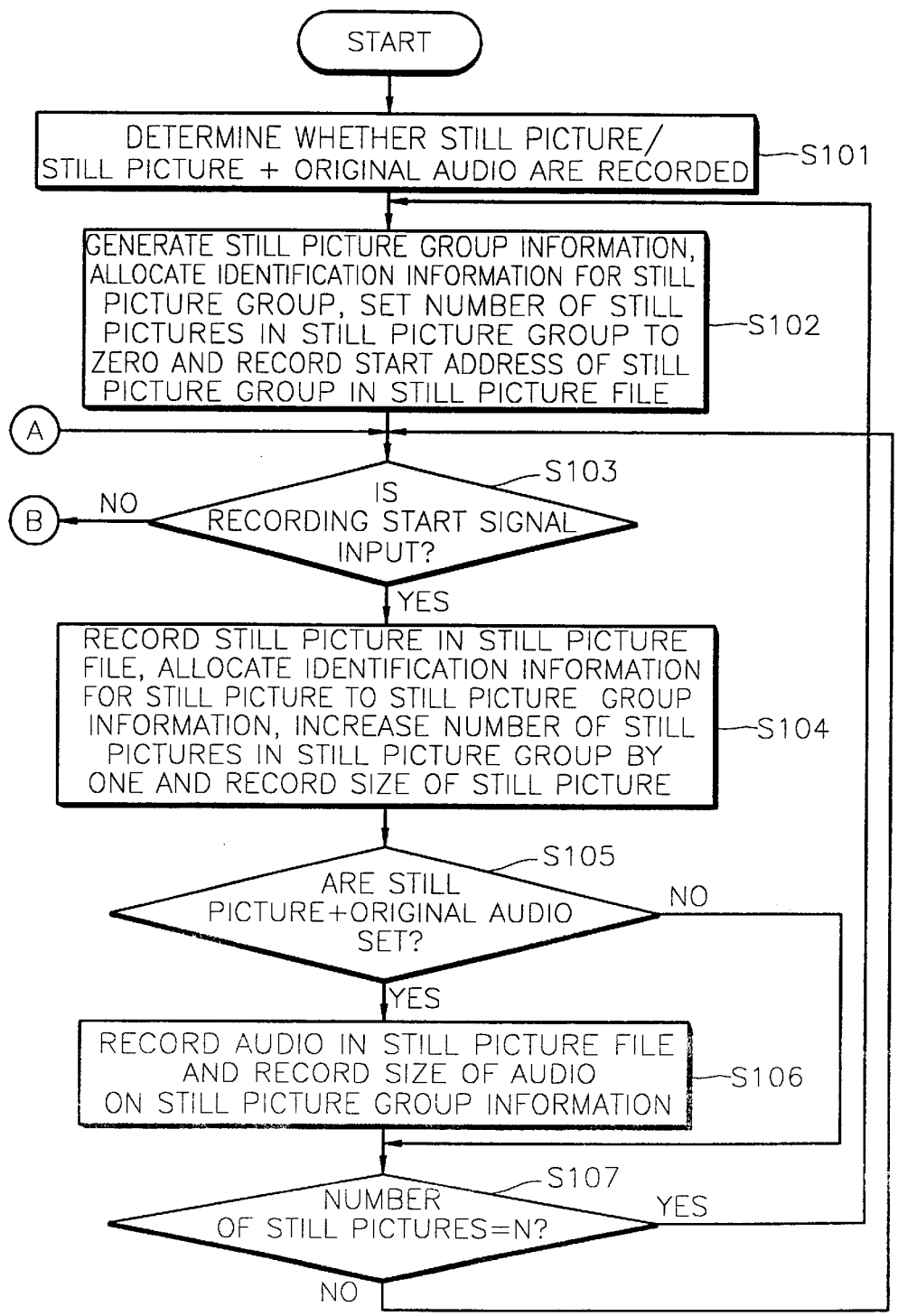
FIG. 19 is a flow chart showing a method for recording a still picture according to an embodiment of a present invention.
Figure 19B:
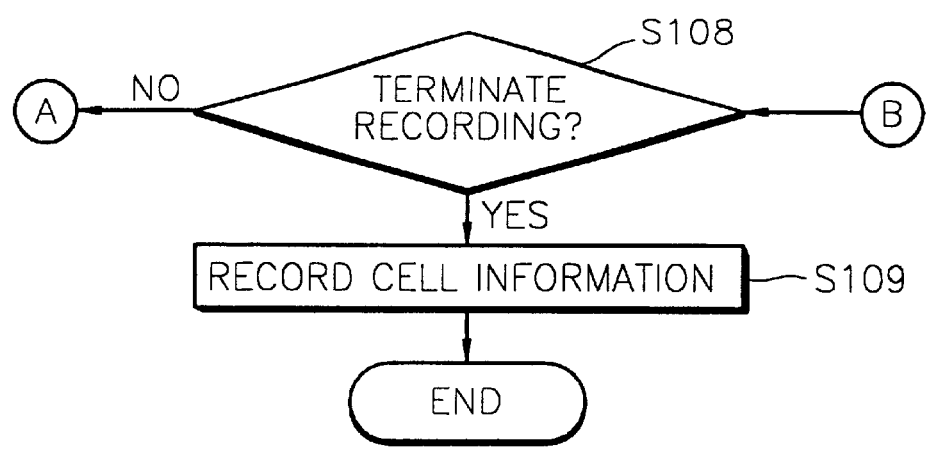

FIGS. 19A and 19B illustrate a flow chart showing a method of recording a still picture according to an embodiment of the present invention, that is, a method of recording a still picture and original audio data. First, it is determined whether a still picture or both a still picture and original audio data is recorded (step S101). Still picture group information is generated, identification for a still picture group is allocated, the number of still pictures in the still picture group is set to "0" and the start address of the still picture group in a still picture file is recorded (step S102). It is then determined whether a recording start signal of a still picture is input by a user or not (step S103). If the recording start signal is input, the still picture is recorded in the still picture file, identification information for the still picture is allocated to the still picture group information, the number of still pictures in the still picture group is increased by one and the size information of the still pictures is recorded in the video map (step S104).

It is determined whether or not a mode set by a user is for recording both a still picture and original audio data (step S105). If yes, the audio data for the still picture is recorded following after the corresponding still picture on the still picture file and the audio size information is recorded in an audio map in the still picture group information (step S106).

It is determined whether the number of still pictures recorded is enough to constitute the information for a still picture group (e.g., 64 maximally) (step S107). If the still picture group information is completed, the procedure returns to step S102 to generate another still picture group information. Otherwise, the procedure proceeds to step S103 to determine whether a recording start signal of a still picture is input by a user or not.

If the mode set by a user is for recording only a still picture in step S105, step S106 is skipped and the procedure proceeds to step 107 to record the next still picture. If the recording start signal of a still picture is not input by a user in step S103, it is determined whether or not to terminate recording (step S108). If it is determined to terminate recording, cell information is recorded and the procedure ends (step S109). Here, the cell information is created for every still picture group so as for all still pictures to be reproduced.

Figure 20:
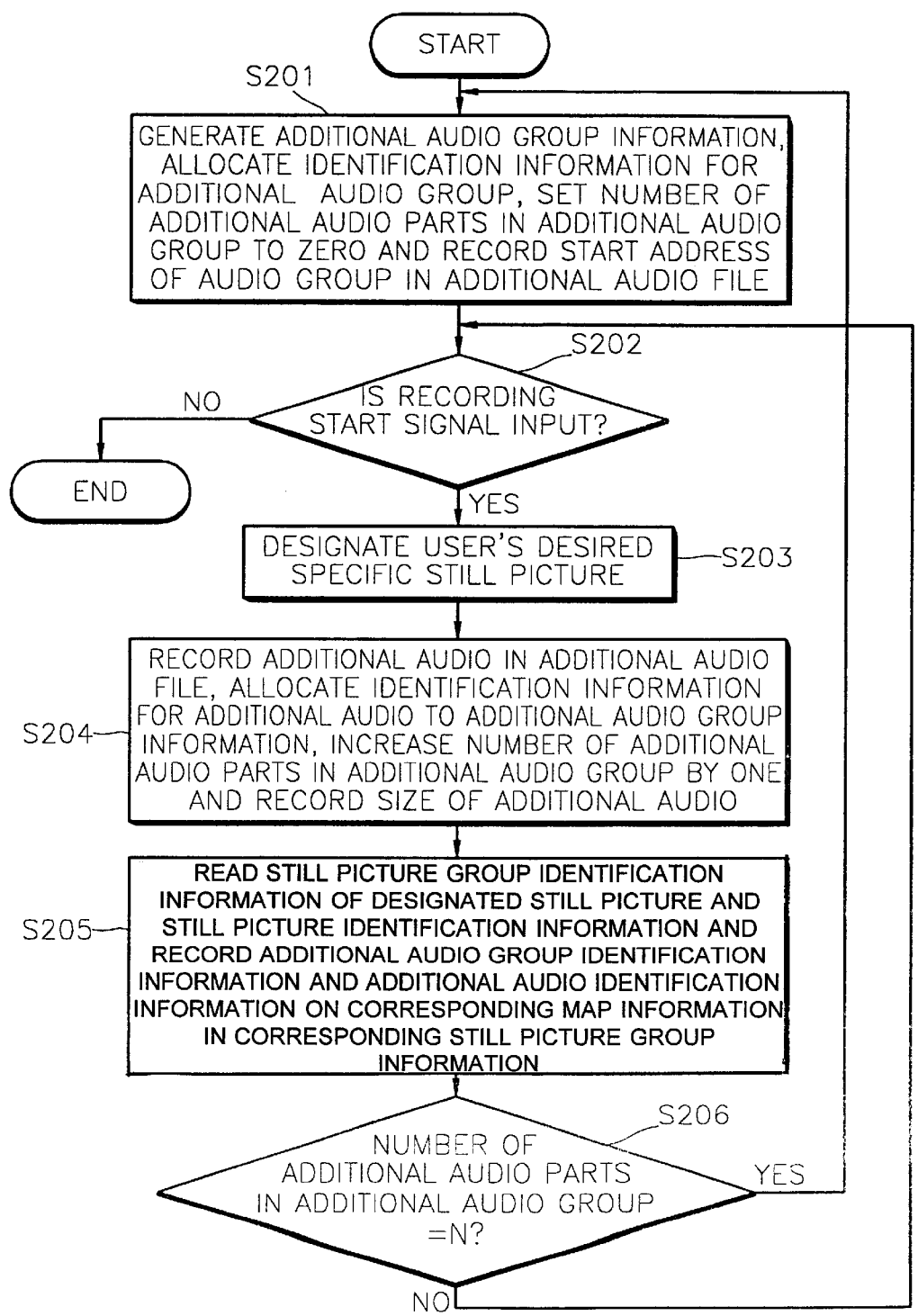
FIG. 20 is a flow chart showing a method for recording additional audio data after recording a still picture according to a first embodiment of the present invention.

FIG. 20 is a flow chart showing a method of recording additional audio data after recording a still picture according to a first embodiment of the present invention. First, additional audio group information is generated, identification information for an additional audio group is allocated, the number of additional audio parts in the additional audio group is set to "0" and the start address of the audio group is recorded in an additional audio file (step S201).

It is then determined whether the recording start signal of additional audio data is input by a user or not (step S202). If the recording start signal is input, a specific still picture to which the user desires to add additional audio data is designated (step S203). The additional audio data is recorded in an additional audio file, identification information for additional audio data in the audio map of the additional audio group information is allocated, the number of additional audio parts in the additional audio group is increased by one, and the size information of the additional audio data in the audio map is recorded (step S204). Although it has been described herein that the additional audio data is recorded in a different file from that of the still picture, the additional audio data can be recorded in a separate area of the same file as that of the still picture.

Identification information for the still picture group of a predetermined still picture and identification information for the still picture are read and the information for the still picture, that is, identification information for an additional audio group for an additional audio part and identification information for additional audio data, are recorded in the video map for the predetermined still picture (step S205).

It is then determined whether the number of additional audio parts in an additional audio group reaches N, that is, enough to constitute a group (step S206). If yes, the procedure goes to step S201 to generate another additional audio group information. Otherwise, it is determined whether the recording start signal of additional audio data is input by a user (step S202). If a recording start signal of additional audio data is not input by a user in step 202, the procedure is terminated.

Here, the step of designating a specific still picture (step S203) may precede the step of determining whether or not a recording start signal of additional audio data is input by a user (step S202).

Figure 21:
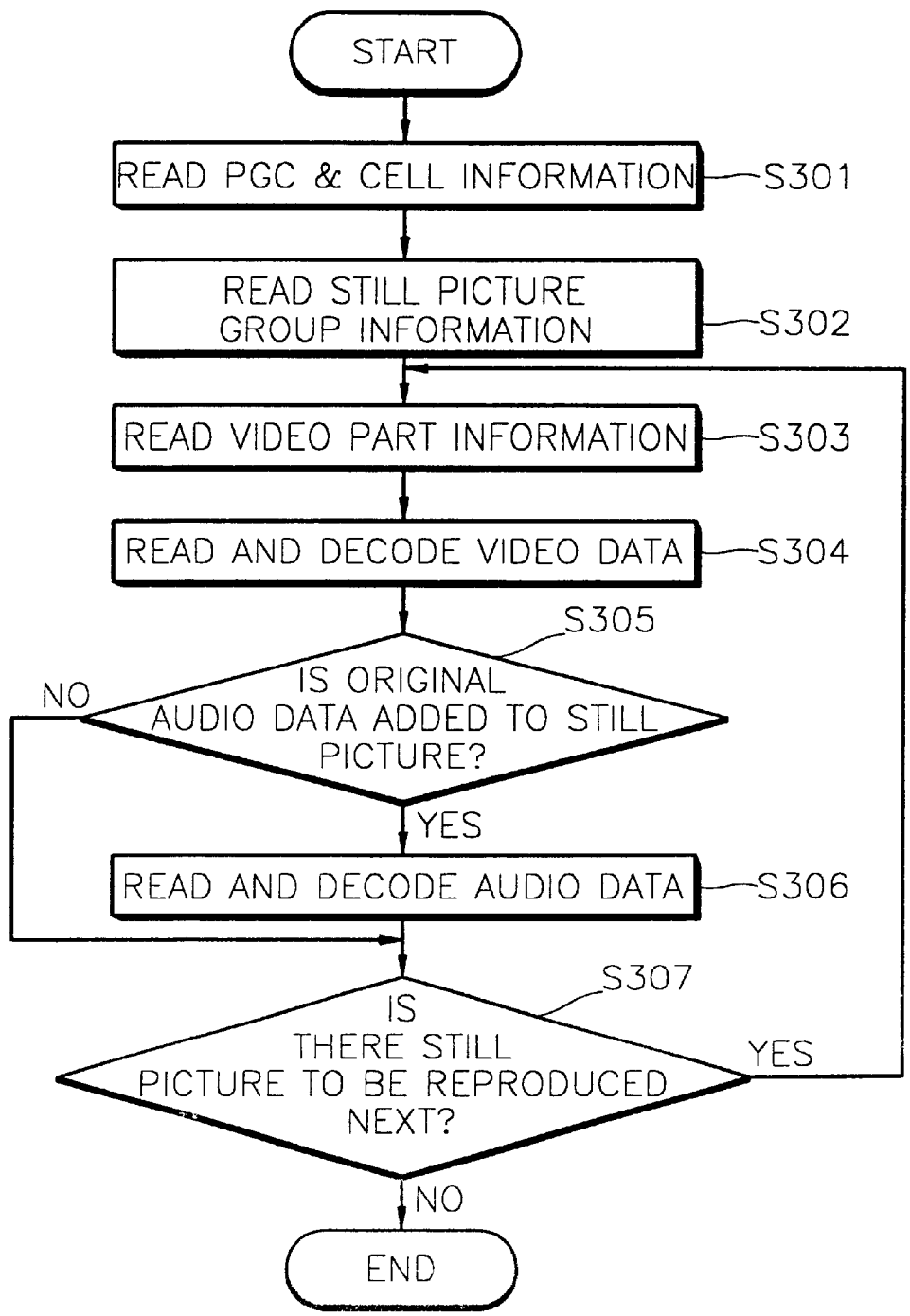
FIG. 21 is a flow chart showing a method for reproducing a still picture according to the first embodiment of the present invention.

FIG. 21 is a flow chart showing a method of reproducing a still picture according to the first embodiment of the present invention, that is, a method of reproducing a still picture and original audio data added thereto. Referring to FIG. 21, PGC information and cell information are read (step S301). Identification information for a still picture group to be reproduced, playback start identification information and playback ending identification information are read from the cell information to read the still picture group information pointed to by the cell (step S302). Video map information for the video part corresponding to the playback start identification information in the read still picture group information is obtained to read the size of a video part, or both video map information and audio map information are obtained in the case of a still picture having original audio data to read the size of a video part and the size of an audio part (step S303).

The position of a desired still picture is calculated by the read video part information and video data located at the calculated position is read and decoded to reproduce the still picture (step S304). Here, the position of a desired still picture is obtained by summing the start position of a still picture group and the size of data preceding the desired still picture. While the still picture is reproduced, it is determined whether original audio data is added to the still picture (step S305). If yes, the original audio data is read and decoded to reproduce the original audio data (step S306). Here, the reading position of the original audio data is obtained by summing the calculated position of the still picture and the size of a video part of the still picture. It is checked whether all still pictures belonging to a cell are reproduced or not using the cell information and then it is determined whether or not there is a still picture to be reproduced next (step S307). If yes, the information for the video part of a still picture to be reproduced next is read (step S303). Otherwise, the procedure is terminated. In the case when there are a plurality of series of cell information, this routine is repeated.

Here, the step of determining whether original audio data is added to a still picture (step S305) may be performed directly after the step of reading the still picture group information (step S302). This is because it is possible to determine that original audio data is added to a still picture in the case when an audio map for an audio part is added subsequently to a video map for a video part, in accordance with the still picture group information.

Figure 22B:
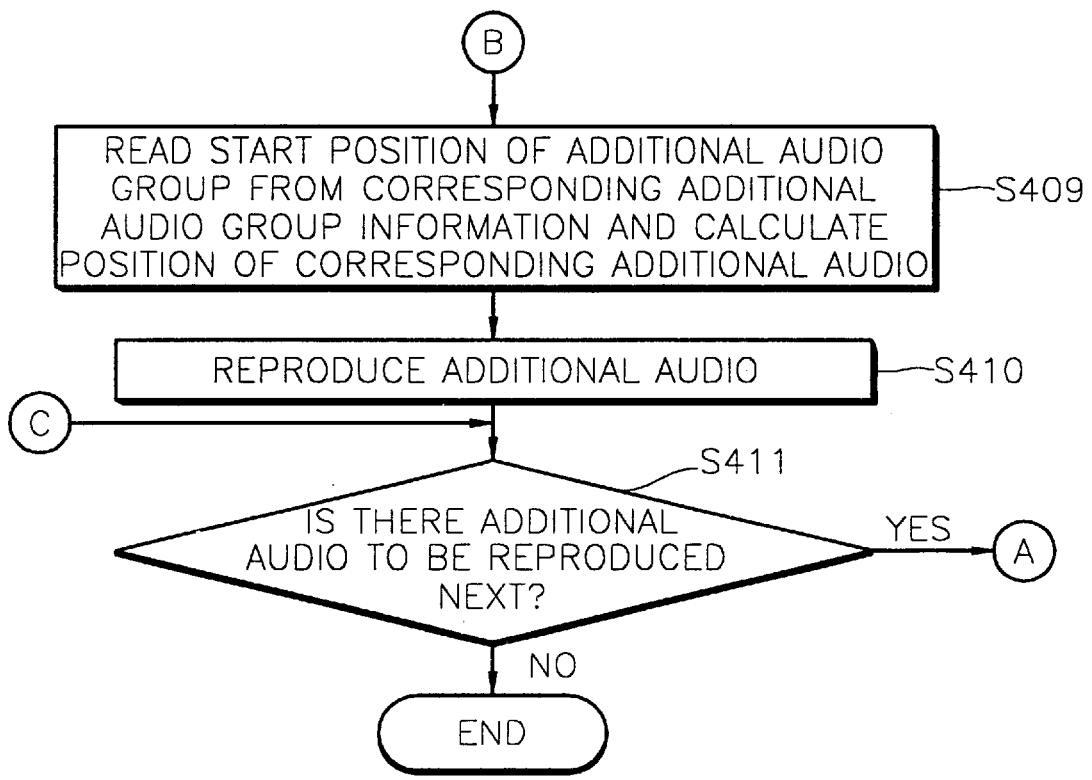

FIGS. 22A and 22B illustrate a flowchart showing a method of reproducing a still picture according to a second embodiment of the present invention, that is, a method of reproducing a still picture, a still picture having original audio data, or a still picture having additional audio data. Referring to FIG. 22A, cell information is read from PGC information (step S401) and then still picture group information pointed to by a cell to be reproduced is read (step 402). Information for the start position of a still picture group is read from the read still picture group information and the position of a desired still picture is calculated (step S403). Here, the position of a desired still picture is obtained by summing the start position of a still picture group and the size of data preceding the desired still picture. The video data is read and decoded in accordance with the position information of the desired still picture to reproduce the still picture (step S404).

It is then checked whether additional audio data is present in the still picture group information or not (step S405). If not, it is checked whether there is original audio data (step S406). Here, the presence of additional audio data in the map information for a video part of the desired still picture to be reproduced can be determined using the identification information for an additional audio group and the identification information for additional audio data. The presence of original audio data can be known by determining whether there is audio information (an audio map) in the map table of the desired still picture to be reproduced.

If there is original audio data in step S406, the read position of the original audio data is calculated (step S407). Here, the read position of the original audio data is obtained by summing the calculated position of the still picture and the size of the video part of the still picture. Original audio data is read from the calculated position information of the still picture and decoded to reproduce the original audio data (step S408) and the procedure proceeds to step S411 as shown in FIG. 22B.

If additional audio data is present in step S405, that is, if the read identification information for the additional audio group designated to the still picture and identification information for the additional audio data are not "0", the start position of the additional audio group is read from the additional audio group information to calculate the position of desired additional audio data (step S409 in FIG. 22B). The position of desired additional audio data is obtained by summing the start position of an additional audio group and the size of the additional audio data preceding the additional audio data having the identification information for desired additional audio data in the additional audio group.

Additional audio data is read from the calculated position information for the desired additional audio data and is decoded to reproduce the additional audio data (step S410). Then, it is determined whether there is a still picture to be reproduced next (step S411). If yes, the procedure returns to step S403. Otherwise, the procedure is terminated (step S411). In the case of reproducing a plurality of cells, the overall procedure is repeated.

Alternatively, instead of step 405 of determining whether additional audio data is present or not and step 406 of determining whether original audio data is present or not, it is first determined using the still picture group information read in step S402 whether the still picture to be reproduced is a still picture having only a video part, one having original audio data added thereto, or one having additional audio data added thereto. If the still picture has only a video part, steps S403 and S404 are performed. If the still picture has original audio data, steps S403, S404, S407 and S408. If the still picture has additional audio data, steps S403, S404, S409, S410 and S411.

Further, according to another aspect of the present invention, before reproduction, a reproduction mode is set by interfacing with a user to determine whether only a still picture is to be reproduced, both a still picture and original audio data are to be reproduced, or both a still picture and additional audio data are to be reproduced.

As described above, according to the present invention, large-capacity still pictures, original audio parts added thereto and additional audio data can be recorded using minimum information. During reproduction, data can be displayed and edited in units of still pictures. Also, it is possible to cope with after-recording of the audio data using the additional audio data.

Also, video maps and/or audio maps for still pictures can be formed in a recording order of bitstreams, thereby allowing effective management of information.

What is claimed is:

1. A recording medium comprising:
   a first region having at least one still picture;
   a second region having at least one additional audio data corresponding to the one still picture; and
   a third region having information indicating a connectivity between still pictures in the first region and additional audio data in the second region, including at least one additional audio group information to arrange the one additional audio data into an additional audio group so as to manage the one additional audio data at a group level, with the one additional audio group information comprising a start position of the additional audio group and sizes of each additional audio data in the additional audio group.

2. The recording medium according to claim 1, wherein each of the first, second and third regions exists in separate files.

3. The recording medium according to claim 1, wherein the first and third regions exist in a same file as one another.

4. The recording medium according to claim 1, wherein the information in the third region includes still picture group information for grouping the still pictures so as to manage still pictures at a group level.

5. The recording medium according to claim 1, wherein the information in the third region further includes still picture general information containing information relating to a number of still picture groups of still pictures, and additional audio general information containing information relating to a number of additional audio groups of additional audio data.

6. The recording medium according to claim 4, wherein the still picture group information includes still picture group general information containing start positions of each still picture group and information relating to a number of video parts in each still picture group, and information for still pictures in each still picture group, the information containing position information for still pictures in each still picture group.

7. The recording medium according to claim 6, wherein the still picture group general information further includes identification information of each still picture group.

8. The recording medium according to claim 6, wherein the position information for still pictures includes size information of the video parts of the still pictures.

9. The recording medium according to claim 8, wherein the first region further includes original audio data related to the one still picture.

10. The recording medium according to claim 9, wherein the position information for still pictures further includes size information of audio parts for the original audio data of the one still picture, and playback time information thereof.

11. The recording medium according to claim 10, wherein the position information for still pictures includes identification information of still pictures in each still picture group.

12. The recording medium according to claim 6, wherein the information for still pictures further includes connectivity information indicative of corresponding additional audio data.

13. The recording medium according to claim 12, wherein the connectivity information further includes identification information of each additional audio group indicative of additional audio data and identification information of the additional audio data in the corresponding additional audio groups.

14. The recording medium according to claim 1, wherein the additional audio group information includes additional audio group general information containing start positions of additional audio groups and information relating to a number of kinds of additional audio data in the additional audio groups, and information for additional audio parts of each additional audio group, wherein the information contains position information for the additional audio parts.

15. The recording medium according to claim 14, wherein the additional audio group general information further includes identification information of the additional audio groups, and the information for the additional audio parts further includes identification information of audio parts in each additional audio group.

16. The recording medium according to claim 14, wherein the position information for the additional audio parts includes the size information of the additional audio parts and playback time information thereof.

17. The recording medium according to claim 4, wherein the third region further stores playback information related to reproduction of still pictures and the additional audio data.

18. The recording medium according to claim 17, wherein the playback information includes identification information of at least one of the still picture groups, and information for playback start and ending positions in the at least one still picture group.

19. The recording medium according to claim 17, wherein the playback information is applied to all or some of the still picture groups.

20. A recordable and/or rewriteable recording medium, comprising:
a plurality of still pictures;
a plurality of additional audio data added to at least some of the still pictures and stored in a separate area from the still pictures;
still picture group information which separates the still pictures into a number of groups so as to manage the still pictures at a group level, wherein the still picture group information includes information indicative of the additional audio data added to the corresponding still pictures; and
additional audio group information which separates the additional audio data into a number of groups so as to manage the additional audio data at a group level, with the additional audio group information including start positions of additional audio groups and sizes of additional audio data in corresponding additional audio groups.

21. The recording medium according to claim 20, wherein the information indicative of additional audio data contained in the still picture group information for the still pictures to which the additional audio data are added, includes identification information of the additional audio groups, and identification information of the additional audio data in each additional audio group.

22. The recording medium according to claim 20, wherein the additional audio data are stored in a file different from that for the still pictures.

23. The recording medium according to claim 20, wherein the additional audio parts are stored in a separate area of a same file as that for the still pictures.

24. The recording medium according to claim 20, wherein the additional audio group information includes additional audio group general information containing position information of each additional audio group and information relating to a number of additional audio parts in each additional audio group, and additional audio maps containing size information of the additional audio parts and playback time information thereof.

25. The recording medium according to claim 24, wherein the additional audio group general information further includes identification information of each additional audio group and each of the additional audio maps further includes identification information of the additional audio data in each additional audio group.

26. A recording medium comprising:
a first region storing still pictures in groups;
a second region storing additional audio data, corresponding to the still pictures, in groups; and
a third region storing general information indicating a relationship between the still pictures and the additional audio data, and indicating start positions on the recording medium for each of the still picture groups and additional audio groups, and sizes of each of the still pictures in each still picture group and each of the additional audio data in each additional audio group.

27. The recording medium according to claim 26, wherein the still pictures comprise a video part and at least some of the video parts have an audio part consecutively recorded, the additional audio data are consecutively recorded and the general information including the start positions for each still picture group and additional audio group and the sizes of the video parts or video parts and audio parts in each still picture group and the sizes of the additional audio data in each additional audio group are recorded in a bitstream order in which the video parts or video parts and audio parts and the additional audio data are recorded.

28. The recording medium according to claim 26, wherein the general information comprises cell information which is playback information and includes group identification information of at least one of the still pictures groups which include still pictures to be reproduced, still picture reproduction start identification information of one of the still pictures at which to begin reproduction and still picture reproduction ending identification information at which to end the reproduction.

29. The recording medium according to claim 26, wherein the still picture groups and the additional audio groups are mixed together in order of recording on the recording medium.

30. The recording medium according to claim 26, wherein the general information includes first information for identifying the still picture groups, second information representing start addresses of a first still picture in each still picture group, and third information indicating a number of still pictures in each still picture group.

31. The recording medium according to claim 27, wherein the general information includes a video map for each of the video parts, the video map including first information indicating a type of the video map, second information indicating identification information for the video part and third information indicating a size of the video part.

32. The recording medium according to claim 31, wherein the general information includes a video map for each of the video parts, the audio map. including first information indicating a type of the audio map, second information indicating playback time of the audio part and third information indicating a size of the audio part.

33. The recording medium according to claim 27, wherein the general information has an additional audio map table including first information indicating identification information for the corresponding additional audio data, second information indicating playback time of the corresponding additional audio data and third information indicating a size of the corresponding additional audio data.

34. The recording medium according to claim 26, wherein each still picture comprises a video part and at least some of the video parts have an audio part, and the general information indicates sizes of each video part and audio part.

35. A recording medium comprising:
a first region storing still pictures in groups, wherein the still pictures of each same group have a same attribute;
a second region storing additional audio data corresponding to the still pictures in groups corresponding to the still picture groups; and
a third region storing general information indicating start positions of each of the still picture groups and the additional audio groups and only sizes without starting positions of each still picture other than a first still picture in each still picture group and only sizes without starting positions of each additional audio data other than a first additional audio data in each additional audio group.

36. A recording medium, comprising:
a plurality of still pictures;
a plurality of additional audio data corresponding to at least some of the still pictures and recorded in a different region from the plurality of still pictures; and
connective information indicating connectivity between the still pictures and the corresponding additional audio data, including start positions of groups of additional audio data and sizes of additional audio data in corresponding groups.

37. The recording medium according to claim 36, further comprising:
still picture group information for separating the still pictures into predetermined groups, wherein the still picture group information includes a start position of each still picture group and sizes of the respective still pictures within the still picture group.

38. The recording medium according to claim 37, wherein the still picture group information comprises for each still picture group a still picture group identifier, a start address of one of the still pictures in the corresponding still picture group, and a number of still pictures within the corresponding still picture group.

39. The recording medium according to claim 38, wherein the still picture group information includes video map tables for each of the still pictures, and each video map table comprises a type of a video map for a video part, a video part identifier, a size of the video part, an information identifier of an additional audio group if one exists, and an identifier of additional audio data in the additional audio group if the corresponding still picture has additional audio data associated therewith.

40. The recording medium according to claim 38, wherein each still picture comprises a video part and at least some of the video parts have an original audio part recorded consecutively after the corresponding video part, and the still picture group information comprises for each original audio part, a type of an audio map for an audio part, a playback time of the audio part, and a size of the audio part.

41. The recording medium according to claim 37, further comprising:
additional audio group information for separating the additional audio data into the groups, wherein the additional audio group information includes the start position of each additional audio group and sizes of the respective additional audio data within the additional audio group;
wherein the connective information further includes identification information for the additional audio groups into which the additional audio data are grouped and identification information for the additional audio data in the corresponding additional audio groups.

42. The recording medium according to claim 41, wherein the additional audio group information includes additional audio group general information containing the start position of the additional audio groups into which the additional audio parts are grouped and information relating to a number of the additional audio parts in each additional audio group, and information for additional audio parts, the information for the additional audio parts containing position information for the additional audio parts in each additional audio group.

43. The recording medium according to claim 42, wherein the additional audio group information for each additional audio group comprises a type of an audio map for a corresponding one of the additional audio parts, a playback time of the additional audio part, and a size of the additional audio part.

44. The recording medium according to claim 36, wherein each still picture comprises a video part and at least some of the video parts have an original audio part recorded consecutively after the corresponding video part.

45. A recording medium comprising:
at least one still picture;
at least one still picture group information to divide the still pictures into still picture groups and comprising start positions of each of the still picture groups and sizes of each of the still pictures in each corresponding still picture group;
at least one additional audio data corresponding to the one still picture;
at least one additional audio group information to divide the additional audio data into additional audio groups and comprising start positions of each of the additional audio groups and sizes of each additional audio data in the corresponding additional audio groups,
wherein the still picture group information includes information that indicates a connectivity between the one still picture and the one additional audio data.

46. The recording medium according to claim 45, wherein each still picture comprises a video part and at least some of the video parts have an original audio part recorded consecutively after the corresponding video part.

47. The recording medium according to claim 45, wherein the one still picture group information comprises connective information indicative of connectivity between the one still picture and the corresponding one additional audio data.

48. A recording medium, comprising:

a first region having at least one still picture;

a second region having at least one additional audio data corresponding to the one still picture; and a third region having information indicating a connectivity between still pictures, each including video data or video data and audio data, in the first region and additional audio data in the second region, including at least one additional audio group information to arrange the one additional audio data into an additional audio group so as to manage the one additional audio data at a group level, with the one additional audio group information comprising a start position of the additional audio group and sizes of each additional audio data in the additional audio group.

49. A recording medium comprising:

a first region storing still pictures in groups;

a second region storing additional audio data, corresponding to the still pictures, in groups; and a third region storing general information indicating a relationship between the still pictures and the additional audio data, and indicating start positions on the recording medium for each of the still picture groups and additional audio groups, and sizes of video parts or video parts and audio parts for each of the still pictures in each still picture group and each of the additional audio data in each additional audio group.

* * * * *